US006176984B1

United States Patent
Narang et al.

(10) Patent No.: US 6,176,984 B1
(45) Date of Patent: Jan. 23, 2001

(54) HIGH TEMPERATURE POLYBENZAZOLE AND POLYETHER ELECTROLYTES

(75) Inventors: Subhash Narang, Palo Alto; Susanna Ventura, Los Altos; Gary Koolpe, San Jose, all of CA (US)

(73) Assignee: SRI International, Menlo Park, CA (US)

( * ) Notice: Under 35 U.S.C. 154(b), the term of this patent shall be extended for 0 days.

(21) Appl. No.: 09/340,777

(22) Filed: Jun. 28, 1999

Related U.S. Application Data

(60) Provisional application No. 60/091,051, filed on Jun. 29, 1998, and provisional application No. 60/109,154, filed on Nov. 20, 1998.

(51) Int. Cl.$^7$ ..................................................... C25B 13/00
(52) U.S. Cl. ........................ 204/296; 429/310; 429/311; 429/314; 429/315
(58) Field of Search ..................................... 429/303, 310, 429/311, 314, 315

(56) References Cited

U.S. PATENT DOCUMENTS

| 5,312,876 |   | 5/1994 | Dang et al. ........................... 525/435 |
| 5,403,675 | * | 4/1995 | Ogata et al. ............................ 429/33 |
| 5,548,055 | * | 8/1996 | Narang et al. ......................... 528/25 |

* cited by examiner

*Primary Examiner*—Bruce F. Bell
(74) *Attorney, Agent, or Firm*—Fish & Associates, LLP; Robert D. Fish

(57) ABSTRACT

High temperature polybenzazole and polyether polymer electrolytes are provided. High temperature polybenzazole polymer electrolytes may comprise a benzobisoxazole, a benzobisthiazole, a benzobisimidazole, a difluorodisulfonated phenyl ring or a sulfonated bisphenylether. High temperature polyether polymers comprise a persulfonated phenyl ring, and a substituted phenyl ring or a substituted bisphenylsulfonyl ring system.

4 Claims, 2 Drawing Sheets

HIGH TEMPERATURE POLYBENZAZOLE AND POLYETHER ELECTROLYTES

This application claims the benefit of U.S. provisional applications No. 60/091,051 filed on Jun. 29, 1998 and No. 60/109,154 filed on Nov. 20, 1998 incorporated herein by reference in their entirety.

FIELD OF THE INVENTION

The field of the invention is high temperature polymer electrolytes.

BACKGROUND OF THE INVENTION

Electrolysis of liquids is almost always performed between at least two electrodes, and in most cases, a separator physically separates the electrodes. To enable electric contact between the electrodes, an electrolyte is employed. Many electrolytic cells known in the art are devices in which the electrolyte and the separator are two distinct functional elements. For example, in a NaCl electrolytic cell, the separator is frequently an asbestos diaphragm or a mercury intermediate electrode, and a highly alkaline NaCl solution serves as electrolyte. However, there are several disadvantages to such a configuration. One disadvantage is that asbestos and mercury pose a severe health hazard. Another disadvantage is that the electrolyte tends to corrode the electrolysis container, often resulting in leakage. A still further disadvantage is that liquid electrolytes usually have a limited life span due to contamination.

To overcome at least some of the problems associated with physically separated electrolyte and separator, polymer electrolytes were developed that combine the electrolyte and the separator into one physical entity. The conductivity of such polymer electrolytes is generally achieved by introduction of ion exchange groups into a polymeric structure. When only one of a cationic and anionic ion exchange group is employed, single ions can migrate through the separator. When both cationic and anionic ion exchange groups are built into the polymer, ion pairs can migrate though the polymer. Polymer electrolytes are frequently superior to a combination of separator and electrolyte, because polymer electrolytes allow a denser packaging of an electrolytic cell. Furthermore, since there is usually no liquid electrolyte in electrolytic cells with polymer electrolytes, problems with limited life span due to contamination of the electrolyte are averted. Moreover, polymer electrolytes often circumvent the problems that usually arise from corrosion due to a fluid electrolyte.

Various polymer electrolytes are known in the art, including poly(ethylene oxide)- and poly(propylene oxide) based compounds, or polysulfone- and polyvinylidene compounds. Such compounds are relatively inexpensive and can be utilized in various applications. Unfortunately, some of these polymer electrolytes suffer from relatively low ion conductivity. Other polymer electrolytes have only limited chemical stability making them less useful for longer term applications.

Despite many advantages, almost all of the known polymer electrolytes suffer from a general drawback in that they are stable only at relatively low temperatures. Temperature stability of polymer electrolytes, however, is relatively important when cost-effectiveness of the electrolytic process is desired. In general, higher temperatures typically increase the rate of most thermodynamically and/or kinetically controlled reactions, including many electrochemical reactions. For example, the efficiency of water electrolysis benefits from an increase in temperature due to a decrease in the thermodynamic potential and a decrease in electrode polarization. Besides the thermodynamic and electrochemical effects of higher temperatures, further advantageous effects may occur. For example, temperatures in the range of approximately 150° C. to 250° C. tend to promote a superior carbon monoxide tolerance during electrolysis of water. Still more advantageously, a temperature range of about 150° C. to 250° C. allows direct oxidation of substrates other than water, including ethanol, other alcohols and hydrocarbons.

Recently, polymer electrolytes with somewhat improved thermal stability have been synthesized and are known in the art. For example, perfluorinated hydrocarbon sulfonate ionomers, such as Nafion™ (a perfluorinated hydrocarbon with sulfonic acid groups), are now commercially available. However, despite their enhanced thermal stability many difficulties still persist. One problem is that perfluorinated hydrocarbon sulfonate ionomers are relatively expensive. Another problem is that such ionomers tend to decompose at temperatures of about 80° C. and above when they are used over a prolonged period of time.

To achieve higher thermal stability of polymer electrolytes, various approaches have been pursued. One approach is to utilize compounds with known higher thermostability. For example, U.S. Pat. No. 5,548,055 to Narang et al., demonstrate polymer electrolytes based on polysiloxanes. However, polysiloxane based polymer electrolytes typically need admixing with plasticizers to enhance ionic conductivity, and further combination with other materials such as polyvinylidene fluoride to improve mechanical strength. In another approach, U.S. Pat. No. 5,741,408 to Helmer-Metzmann, the author shows that cross-linking polymeric strands in a polymer electrolyte can improve the stability of a high temperature polymer electrolyte. However, crosslinking generally involves at least one additional step in the preparation of the final polymer electrolyte. More disadvantageously, crosslinking reactions usually require a plurality of reactive groups in the polymer. When the crosslinking reaction is not forced entirely to completion, remaining unreacted crosslinking groups may render the polymer more susceptible to chemical instability. In a still further approach, Ogata et al. describe in U.S. Pat. No. 5,403,675 a sulfonated polyphenylene polymer electrolyte. However, polyphenylenes are generally difficult to dissolve, and solubilizing side groups such as alcohol-, aldehyde- or alkaryl groups are frequently introduced. Solubilizing side groups, however, may introduce a chemical instability under high temperature conditions.

Novel polymer electrolytes with increased thermal stability have been developed, however, known polymer electrolytes still suffer from several disadvantages. Therefore, there is still a continuing need for improved high temperature polymer electrolytes.

SUMMARY OF THE INVENTION

The present invention is directed to high temperature polybenzazole and polyether polymer electrolytes.

In one preferred aspect of the inventive subject matter, the high temperature polybenzazole polymer electrolyte comprises a benzobisoxazole, a benzobisthiazole, or a benzobisimidazole. In a more preferred aspect the benzobisoxazole is fluorinated.

In another aspect of the inventive subject matter, the high temperature polybenzazole comprises a difluorinated disulfonated phenyl ring or a sulfonated bisphenylether.

In a still further preferred aspect of the inventive subject matter the high temperature polyether polymer comprises a persulfonated phenyl ring, and a substituted phenyl ring or a substituted bisphenylsulfonyl ring system.

Various objects, features, aspects and advantages of the present invention will become more apparent from the following detailed description of preferred embodiments of the invention.

DETAILED DESCRIPTION

As used herein, the term "electrolyte" refers to a nonmetallic electric conductor in which current is carried by the movement of ions.

As further used herein, the term "ion exchange group" refers to a sulfonic acid group. It is contemplated that such an ion exchange group may be located on more than one position in the high temperature polybenzazole and polyether polymer electrolyte.

In a preferred embodiment, the polymer electrolyte is a polymer of a 2,5-difluoro-3,6-disulfonylphenyl-benzobisoxazole with a molecular weight of approximately 30,000 Dalton.

In alternative embodiments, molecular weight of the polymer need not be limited to 30,000 Dalton, and may vary considerably between about 500 Dalton and 1,000,000 Dalton. In further alternative embodiments, the benzobisoxazole moiety may be substituted with various benzobisazoles other than a benzobisoxazole. Contemplated alternative benzobisazoles are a 5,11-difluoro benzobisoxazole, benzobisimidazole, and benzobisthiazole.

In still further alternative embodiments, when the benzobisazole moiety is a benzobisoxazole or a benzobisthiazole, the 2,5-difluoro-3,6-disulfonylphenyl moiety may be substituted with a bis(sulfonylphenyl)ether. In yet further alternative embodiments, when the 2,5-difluoro-3,6-disulfonylphenyl moiety is substituted with a bis(sulfonylphenyl)ether, then the benzazole moiety may be substituted with a bis(benzothiazole)ether or a bis(benzothiazole)bis(trifluoromethyl)-methane. In still further alternative embodiments, it is contemplated that the 2,5-difluoro-3,6-disulfonylphenyl moiety may also be coupled with a bis(benzothiazole)ether.

In another preferred embodiment, the electrolyte is a polymer of a 2,3,5,6-tretrasulfophenylether -bis(2,3,5,6-tetrafluorophenyl)ethersulfone with a molecular weight of approximately 50,000 Dalton.

In alternative embodiments, molecular weight of the polymer need not be limited to 50,000 Dalton, and may vary considerably between about 500 Dalton and 1,000,000 Dalton. It is contemplated that in further alternative embodiments, the degree of fluorination in the bis(2,3,5,6-tetrafluorophenyl)-sulfone moiety may vary substantially. For example, in each of the phenyl rings in the bis(2,3,5,6-tetrafluorophenyl)sulfone moiety, a fluorine atom may be exchanged for a sulfonyl group, respectively. Thus, alternative polyethersulfones may independently comprise between 1 and 4 fluorine atoms per phenyl ring.

In other alternative embodiments, the bis(2,3,5,6-tetrafluorophenyl)sulfone moiety ay be replaced by a 2,5-sulfonyl-3,6-cyanophenyl moiety, or a 2,5-fluoro-3,6-cyanophenyl moiety.

It is also contemplated that alternative polymer electrolytes can be formulated from blends, interpenetrating or semi-interpenetrating networks containing the described polymers.

EXAMPLES

Figure 1:
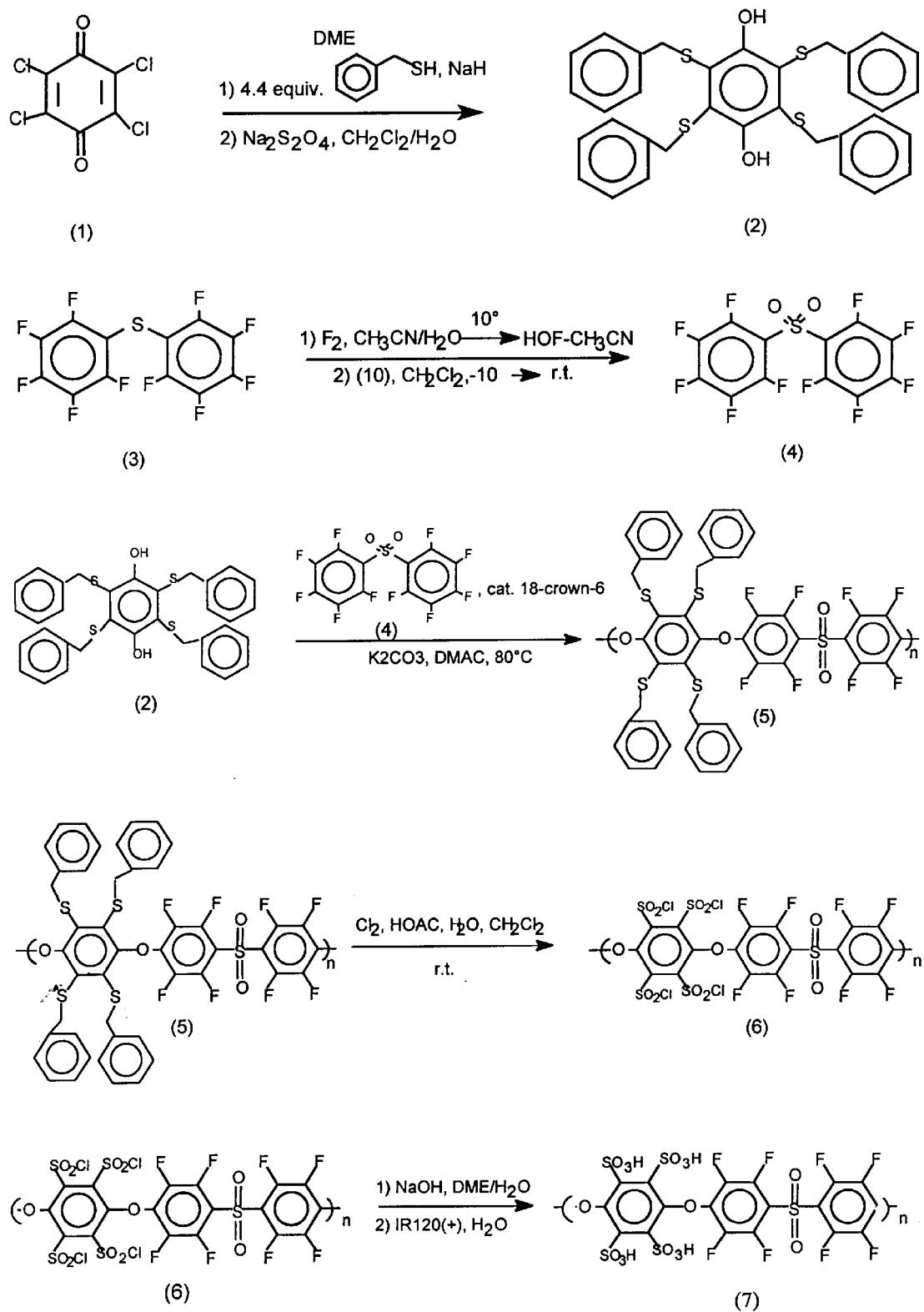
FIG. 1 is a scheme depicting the synthesis of a first electrolyte according to the inventive subject matter.
Figure 2:
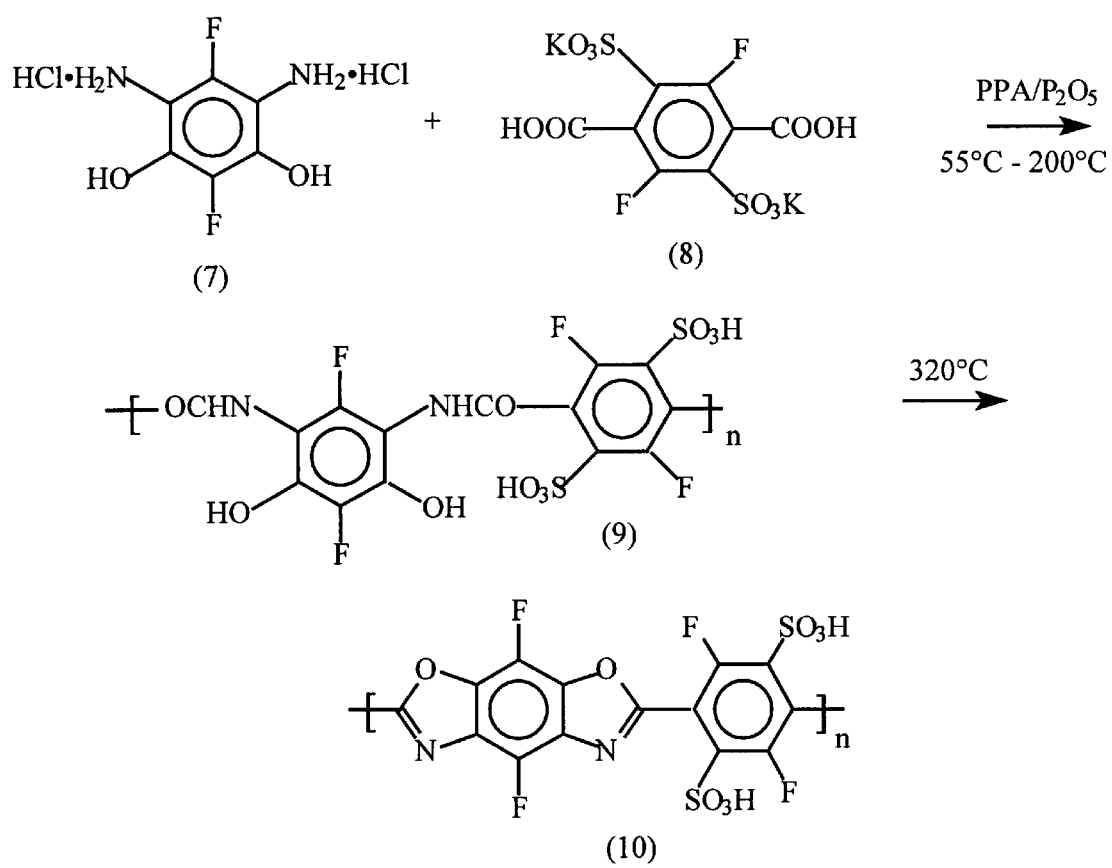
FIG. 2 is a scheme depicting the synthesis of a second electrolyte according to the inventive subject matter.

The following examples describe the synthesis of poly(perfluoroethersulfone) sulfonic acid and perfluorodisulfopolybenzoxazole, which is schematically depicted in FIG. 1 and FIG. 2. Further examples describe the preparation of films from described electrolytes.

Example 1

Synthesis of 2,3,5,6-tetrathiobenzyl-1,4-hydroquinone (2)

To a 15° C. cooled mixture of 4.92 g (20.0 mmol) of chloranil (1) and 10.6 mL (90.0 mmol) of benzyl mercaptan in 230 mL of ethylene glycol dimethyl ether (DME) was added 3.9 g (97 mmol, 60% in mineral oil, washed with hexanes) of sodium hydride in portions over 20 minutes under an atmosphere of Argon. The mixture was allowed to stir at room temperature over night and was concentrated in vacuo. The residue was dissolved in dichloromethane and shaken for 5 minutes with 17.5 g (85 mmol 85%) of sodium hydrosulfite in water in a separatory funnel. The dichloromethane layer was separated, washed with water and brine, dried ($MgSO_4$), filtered, and concentrated to 18.7 g of the crude product mixture. Purification by flash column chromatography on 150 mL of silica gel (1:1 $C_6H_{14}/CH_2Cl_2$ eluant) followed by crystallization from diethyl ether afforded 6.96 g (57%) of (9) as a colorless solid. $^1H$ NMR ($CDCl_3$) δ3.87 (s, 8H, $SCH_2$), 7.00–7.30 (m, 2OH, aryl).

Synthesis of bis(pentafluorophenyl)sulfone (4)

According to the procedure adapted by S. Rozen, et al. (R. Beckerbauer, B. E. Smart, Y. Bareket, S. Rozen, *J Org. Chem.* 1995; 60, 6186–6187) for the oxidation of electrodeficient sulfides to sulfones using HOF—$CH_3CN$, a mixture of 700 ml of acetonitrile and 70 ml of water was cooled to 10° C. in a $CO_2/CCl_4$ cooling bath and a 10% fluorine 90% $N_2$ gas mixture was bubbled in slowly for 50 minutes. The gas was stopped, and a mixture of 2.00 g (5.46 mmol) of bis(pentafluorophenyl)sulfide (3) dissolved in 70 ml of cold chloromethane was added all at once. The cooling bath was removed and the mixture was allowed to warm to room temperature and stir over night. The solvent was room temperature and stirred over night. The solvent was evaporated and the residue was neutralized with saturated sodium bicarbonate and extracted with dichloroethane, washed with water, dried (MgSO4), filtered, and concentrated to 2.23 g of the crude product. Purification by flash column chromatography on 50 ml of silica gel and elution with 3:2 hexanes-dichloromethane afforded 2:14 g (98%) of (4) as a colorless solid. $^{19}F$ NMR ($CDCl_3$): δ-136 (d, J=20 Hz, 4F),–141 (M,2F),–157.9 (t, J=20 Hz, 4F)

Copolymerization of 2,3,5,6-tetrathiobenzyl- 1,4-hydroquinone (2) and bis(pentafluorophenyl) sulfone (4)

According to the procedure adapted by R. Kellmen, et al.(R. Kellman, R. F. Williams, G. Dimotsis, D. J. Gerbi, and J. C. Williams, *ACS Symp. Ser.*, 1987, 326 (Phase Transfer Catal.: New Chem, Catal., Appl.) 128–142) for the nucleophilic aromatic substitution in condensation polymerization catalyzed by solid liquid phase transfer, a mixture of 2.70 g (4.50 mmol) of 2,3,5,6-tetrathiobenzyl-1,4-hydroquinone (2) and 1.79 g (4.50 mmol) of bis(pentafluorophenyl)sulfone (4) was treated with 2.69 g (19.5 mmol) of anhydrous potassium carbonate and 0.33 g (1.26 mmol) of 18-crown-6 in 22 ml of N,N-dimethylacetamide and the mixture was heated at 80° C. for 18 h with stirring under an atmosphere of Argon. The mixture was concentrated in vacuo, extracted with dichloromethane, washed with aqueous sodium dihydrogenphosphate and water, dried ($MgSO_4$), filtered, and concentrated to 4.73 g of gold-colored solid. $^1H$ NMR ($CDCl_3$: δ3.90–4.00 (br s, $CH_2S$), 6.90–7.30 (br m, aryl).

Synthesis of poly(perfluoroethersulfone)sulfonyl chloride (6)

Using a procedure developed for the conversion of dialkylsulfides into alkanesulfonyl chlorides, 4.7 g of the polymer (5) was dissolved in 28 ml of dichloromethane, a mixture of 50 ml of acetic acid and 6.6 ml of water was added, and the mixture was treated with chlorine bubbled through the solution, maintaining the reaction at room temperature, for 15 hr. Excess chlorine was removed under aspirator pressure, and the product mixture was extracted with dichloromethane, washed with 6×250 ml of water and brine, dried (MgSO$_4$), filtered, and concentrated to afford 4.85 g of gold-colored solid, which was hydrolyzed without further purification.

Synthesis of poly(perfluoroethersulfone)sulfonic acid (7)

To a mixture of 4.84 g of the polysulfonyl chloride (6) in 75 ml of DME was added 1.46 g (36.0 mmol) of sodium hydroxide in 20 ml of water dropwise with stirring at 15° C. The mixture was stirred for two hours at room temperature and concentrated in vacuo. The mixture was treated with 30 g of IR120(+) in water with stirring for two hours, passed through an additional 15 g of resin, and concentrated in vacuo to 3.1 g of the crude product mixture. The crude product was dissolved in 20 ml of methanol, filtered and added to 400 ml of diethyl ether with stirring and the supernatant was discarded. The solid polymer was triturated with dichloromethane and ethyl acetate and dried to afford 2.64 g (75%) of (7) as a tan powder.

Example 2

Perfluorodisulfo-PBO was synthesized from the polycondensation of dihydrochloride difluorodiamino p-hydroquinone (7) with disulfodifluoroterephthalic acid (8) in freshly prepared PPA using P$_2$O$_5$ adjustment method. Initially, the o-hydroxy polyamide prepolymer (9) was formed. Upon heating at 320° C., the prepolymer was cyclized to the final perfluorodisulfo-PBO (10).

Example 3

Mechanically stable films from the described polybenzabisazole- and polyether polymers can be fabricated by admixing the polymers with the basic polymer polybenzimidazole (PBI).

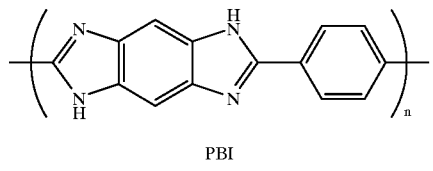

PBI

The sulfonic acid polymer is dissolved in dimethylacetamide and a small amount of triethylamine. The solution is then added dropwise to a solution of PBI in dimethylacetamide. The resulting solution is cast over a thin nonwoven glass fiber separator and the film is dried at 60° C. After drying at 60° C., the polymer film is examined by scanning electron microscopy (SEM). No cracks were observed for films prepared from blends containing PBI and sulfonic acid polymer in molar ratio of 1:1 or higher. The films are then heated under argon at 220° C. for 15 hours and again examined by SEM. No cracks are observed.

Alternatively the sulfonic acid polymer is dissolved in dimethylacetamide, triethylamine and a small amount of 10% NaOH. The solution is then added dropwise to a solution of PBI in dimethylacetamide. The resulting solution is cast over a thin nonwoven glass fiber separator and dried at 60° C. After solvent evaporation the film is heated in a furnace at 200° C. for fifteen hours under argon. The film is then soaked in 0.5 M HCl for 18 hours and repeatedly washed in water before testing.

Thus, specific embodiments and applications of high temperature polybenzazole and polyether electrolytes have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A high temperature polymer electrolyte comprising:

at least one of the structures 1, 2 or 3, wherein structure 1 is

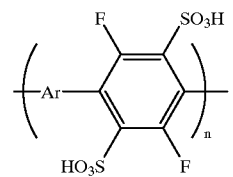

with n between 1 and 100000, wherein Ar is a benzobisazole of the formula

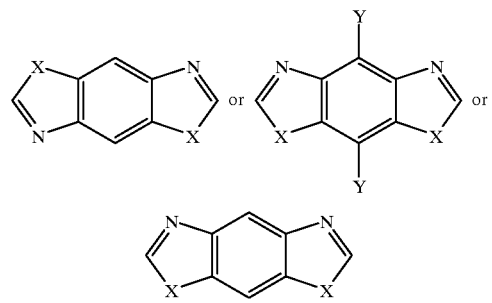

wherein X is O, S or NH, Y is H, or F when X is O, structure 2 is

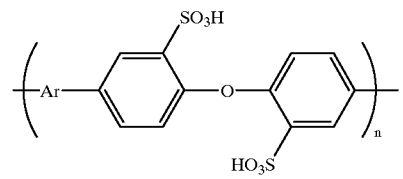

with n between 1–100000, wherein Ar is a benzobisazole of the formula

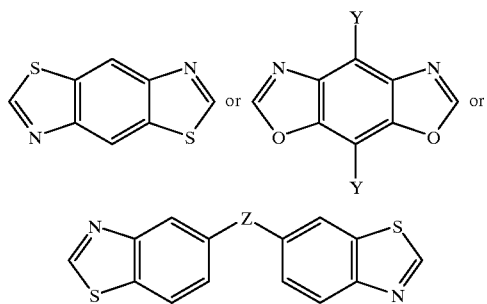

wherein Y is F or H, Z is O or C(CF$_3$)$_2$,
structure 3 is

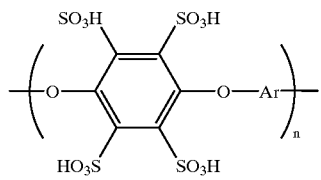

with n between 1–100000, wherein Ar is a substituted phenyl or a substituted bisphenyl sulfonyl of the formula

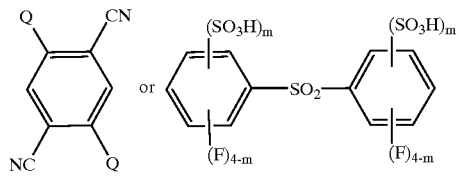

wherein Q is SO$_3$H or F, m=0–3.

2. A high temperature polymer electrolyte comprising:
structure 1 wherein
structure 1 is

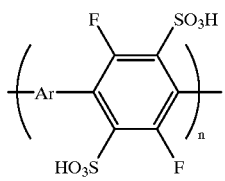

with n between 1 and 100000, wherein Ar is a benzobisazole of the formula

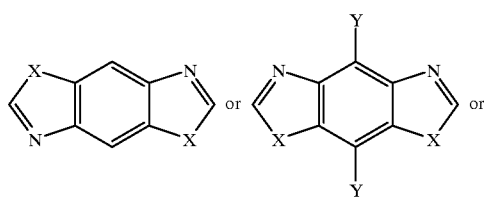

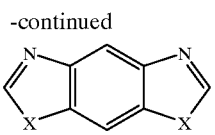

wherein X is O, S or NH, Y is H, or F when X is O.

3. A high temperature polymer electrolyte comprising:
structure 2 wherein
structure 2 is

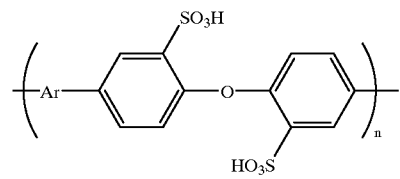

with n between 1–100000, wherein Ar is a benzobisazole of the formula

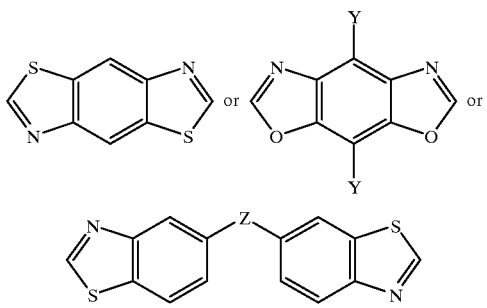

wherein Y is F or H, Z is O or C(CF$_3$)$_2$.

4. A high temperature polymer electrolyte comprising:
structure 3 wherein
structure 3 is

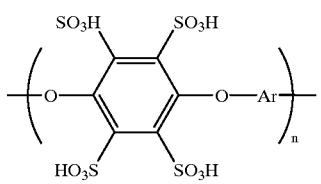

with n between 1–100000, wherein Ar is a substituted phenyl or a substituted bisphenyl sulfonyl of the formula

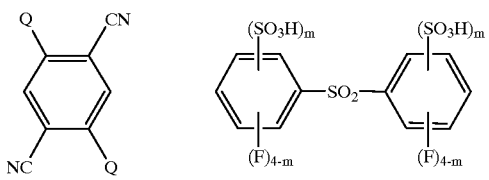

wherein Q is SO3H or F, m=0–3.

* * * * *